C. DYER.
SHOCK ABSORBING STEERING MECHANISM.
APPLICATION FILED OCT. 20, 1919.
1,349,415. Patented Aug. 10, 1920.
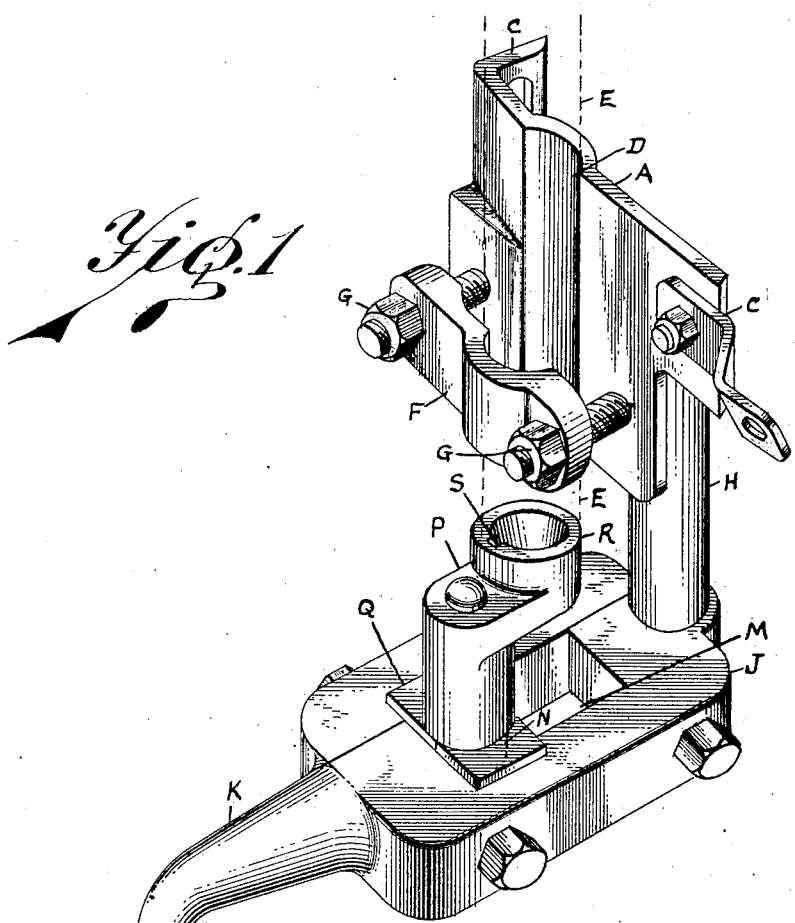
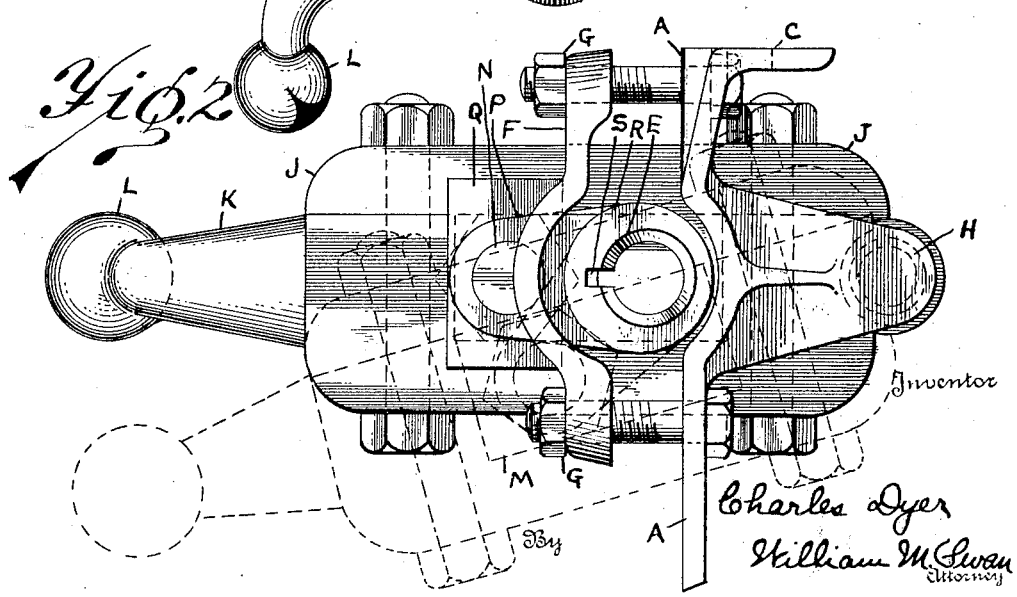

UNITED STATES PATENT OFFICE.

CHARLES DYER, OF DETROIT, MICHIGAN.

SHOCK-ABSORBING STEERING MECHANISM.

1,349,415.  Specification of Letters Patent.  Patented Aug. 10, 1920.

Application filed October 20, 1919. Serial No. 331,898.

*To all whom it may concern:*

Be it known that I, CHARLES DYER, a citizen of the United States, residing at Detroit, county of Wayne, State of Michigan, have invented a certain new and useful Improvement in Shock-Absorbing Steering Mechanism, and declare the following to be a full, clear, and exact description of the same, such as will enable others skilled in the art to which it pertains to make and use the same, reference being had to the accompanying drawings, which form a part of this specification.

This invention relates to shock-absorbing steering mechanism for motor vehicles, and has for its object the lessening of the shocks and vibratory movements transmitted to the hand wheel, caused by the striking of the traction wheels against uneven roadway surfaces; a further object of my invention is the prevention of locking in the several parts of the steering mechanism, as well as the securing of a greater leverage on the forward or steering wheels, when the steering mechanism is actuated in either direction by the driver.

In the drawings:

Figure 1 is a perspective of my improved device, with the relative position of the steering post indicated by dotted lines.

Fig. 2 is a plan view from above.

A indicates an attaching or frame plate of suitable contour, designed to be secured to the frame of the vehicle by means of the bracket B and screws or bolts through the flange C. The face of the plate A is grooved as at D for the frictional engagement therein of the steering post E, which is held in place relatively thereto by the complementarily grooved clamping piece F, secured by bolts G. The frictional engagement of the adjusting or clamping plates or members A and F will enable a braking action to be applied to the steering post.

Projecting downwardly from the frame plate A is a fixed column H, upon whose lower end is sleeved the block J, from the forward end of which projects the neck K carrying the steering knuckle L, which engages in a socket (not shown) in the crosswise steering link adjacent the forward axle of the vehicle in the usual manner. This block J, which is thus capable of swinging in a horizontal plane about its supporting column H as a center, has its central portion cut away to form the slideway M, in which the lower end N of the steering post crankhead P slidably engages, the plate Q serving to support the end N in suitable operative relation thereto, and being itself slidable along the top surface of the block J, since its ends project thereover beyond the sides of the slideway M. In the offset upper end R of the crankhead P the lower end of the steering post E is fixed, being held against rotation therein by the engagement of a complementary projection in the side of the steering post E in the key slot S.

As the steering wheel is turned by the operator, the crankhead piece P is swung with it, resulting in swinging its lower end N to one side. The slidable engagement of this part in the slideway M of the block J causes it to swing accordingly, resulting in actuating the steering links on the axle and consequently the steering wheels of the vehicle. When the steering wheels are in neutral position, that is, pointing straight ahead, the lower end N of the crankhead is located at the extreme forward end of the slideway M, as shown in Fig. 1, and in the full-line position shown in Fig. 2. When, however, the pivoted block J has been swung to one side, as to the dotted-line position shown in Fig. 2, the lower end N of the crankhead is drawn back somewhat from such extreme forward position in the slideway M, in fact, it is the eccentricity of the central axis of the steering post E relatively to that of the fixed column H, which, coupled with the fact that both of these parts are held in place by the frame plate A, causes the parts to so act upon one another that the desired lateral swing of the block J and with it the neck K and knuckle L takes place, causing the functioning of the entire mechanism. However, such a coöperating organization of parts is interposed between the traction wheels and the steering wheel, that the shocks upon the traction wheels due to striking ruts or stones in the roadway are largely absorbed before reaching the steering wheel, thus minimizing the fatigue of the driver due to holding onto the steering wheel with the degree of firmness needed to properly guide the vehicle.

What I claim is:

In a shock absorbing steering mechanism, the combination with a steering post, of a clamping plate or member provided with means for securing it to the frame of a machine and having a fixed depending column forming a pivot, an adjustable clamping plate, adjusting means connecting the clamping plates for holding the same in frictional engagement with the steering post to produce a braking action thereon, a longitudinally slotted member pivotally supported at one end by the said fixed column adapted to be connected at the other end with the steering wheels of the machine, and a crank element mounted on the steering post and operating in the slot of the pivoted member.

In testimony whereof, I sign this specification in the presence of two witnesses.

CHARLES DYER.

Witnesses:
WILLIAM M. SWAN,
JEFFERSON G. THURBER.